Oct. 1, 1957   A. K. PANDJIRIS   2,808,500
WELDING METHODS AND APPARATUS
Filed Aug. 6, 1954   4 Sheets-Sheet 1

INVENTOR.
ANTHONY K. PANDJIRIS

BY Bruninga and Sutherland,
ATTORNEYS

Oct. 1, 1957  A. K. PANDJIRIS  2,808,500
WELDING METHODS AND APPARATUS
Filed Aug. 6, 1954  4 Sheets-Sheet 2

INVENTOR,
ANTHONY K. PANDJIRIS

BY Brunings and Sutherland,
ATTORNEYS

Oct. 1, 1957                A. K. PANDJIRIS              2,808,500
                        WELDING METHODS AND APPARATUS
Filed Aug. 6, 1954                                    4 Sheets-Sheet 3

INVENTOR.
ANTHONY K. PANDJIRIS
BY Brurings and Sutherland
ATTORNEYS

Oct. 1, 1957  A. K. PANDJIRIS  2,808,500
WELDING METHODS AND APPARATUS
Filed Aug. 6, 1954  4 Sheets-Sheet 4
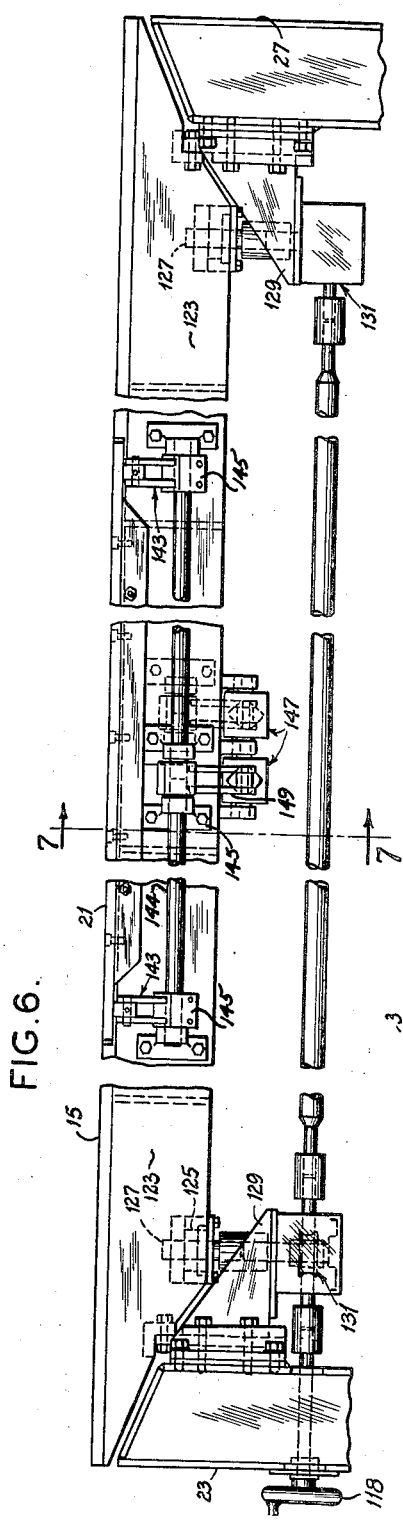
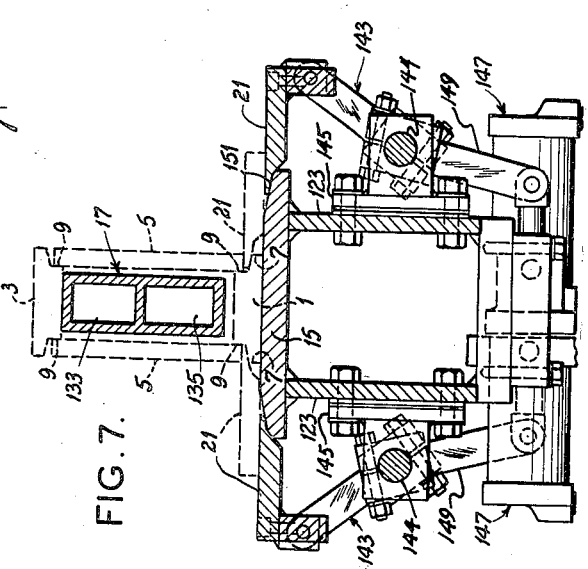
INVENTOR.
ANTHONY K. PANDJIRIS
BY Bruninga and Sutherland
ATTORNEYS United States Patent Office 2,808,500
Patented Oct. 1, 1957

2,808,500

WELDING METHODS AND APPARATUS

Anthony K. Pandjiris, Glendale, Mo., assignor to The Pandjiris Weldment Company, St. Louis, Mo., a corporation of Missouri Application August 6, 1954, Serial No. 448,329

8 Claims. (Cl. 219—137)

This invention relates to welding, and more particularly, to the fabrication of welded beams and similar items requiring longitudinal welds.

When narrow plates are joined by longitudinal welding, considerable difficulty is encountered in preventing distortion of the type caused by localized heating and expansion of the base metal or contraction of the welds. It is frequently necessary to straighten the work after welding, and in multiple-pass welding, several straightening operations may be required. Moreover, when rather long pieces are to be welded, as in the fabrication of beams, distortion occurring at an early stage may cause the pieces to move out of alignment before completion of the weld unless the work is held in a heavy jig, and even then it may not be possible to prevent such distortion.

Accordingly, it is an object of the invention to provide a process whereby beams and similar items of substantial length may be welded with very little resulting distortion. Among the other objects of the invention may be noted the provision of an improved automatic welding machine for manufacturing beams; the provision of an improved process of welding elongate members of box cross section; and more particularly, the provision of a one-pass method of and apparatus for welding members of box cross section, wherein distorting forces developed along certain portions of the work are substantially counteracted by similar forces occurring in opposite sections.

Briefly, distortion in a welded beam is herein prevented by arranging four narrow plate-like members in a box section, and by using four welding units which are mounted to travel substantially opposite one another along the joints between the plates. The welds at the four joints are begun substantially simultaneously at one end of the beam and are built up at approximately the same rate along the length of the beam, the top and bottom plates overlying the vertical side plates to provide upper and lower V-butt joints at each side of the work. Welding is accordingly "horizontal" (rather than "flat" or "overhead"); and the top and bottom plates may have stepped edges which provide shoulders, against which the side plates are clamped during the welding operation.

These operations are carried out on a welding machine, which supports the plates in alignment while the welding heads traverse the beams lengthwise. The machine may have a table upon which the bottom plate lies, the top plate being supported upon an overlying horn. The horn may be supported upon a base by a support which is releasable at one end to clear the work, and the table may be made relatively movable to facilitate initial assembly of the work and to permit adjustment of the machine to various cross sectional shapes. After the top and bottom shouldered plates are adjusted to their proper spacing, the side plates are clamped against the shoulders by transversely movable jaws; and in some instances, it may be desirable to provide wedge-like spacing elements which support the side plates at their lower edges prior to inward movement of the clamping jaws.

These elements are withdrawn clear of the lower joints after inward actuation of the side jaws, and the side plates are then held in position by a frictional engagement with the shoulders of the horizontal plates.

The jaws are affixed to longitudinal frames, which are mounted at the sides of the machine for transverse movement, and a traveling carriage is mounted on each frame for longitudinal movement thereof. The carriages hold the welding heads that feed the electrodes to the joints, the joints being filled upon movement of the carriages along the frame. A submerged arc process of welding may be employed, flux being built up on the table and on the jaws to cover the lower and upper joints of the work. The invention further contemplates that these jaws will have vertical passages for conveying flux from the upper joints to the lower joints, and in that event, the lower electrodes may follow slightly behind the upper electrodes.

Other features of the invention will be in part apparent from and in part pointed out in the following detail description taken in connection with the accompanying drawings, in which:

Fig. 6 is a longitudinal detail view illustrating details of the work-supporting table; and Fig. 7 is a cross section taken on the line 7—7 of Fig. 6 to show mechanism for initially positioning the side plates.

As indicated previously, the invention is concerned with welded structures of substantial length, and particularly with beam-like members which are formed from a plurality of thick plate-like members. For example, the arms that carry the scoop of a bulldozer must be very strong, and accordingly, are made by welding four narrow plate-like members to form a box beam. Heretofore, several welding operations were required, the most convenient procedure being that of assembling three plates to form an inverted channel section with conventional open-corner joints at the edges of the plates. The welding operation employed in filling these joints was relatively simple in that the welding was at a forty-five degree angle from the "flat" and "horizontal" standard conditions. Welding from a reverse or "overhead" position was not satisfactory, hence it was impossible to weld more than two joints at one time. The channel section was then inverted, and the fourth plate was similarly welded to complete the box beam. With this process, however, considerable twisting and bending resulted from expansion and contraction of the heated metal, and it was generally necessary to straighten the work after each welding pass.

Figure 1:
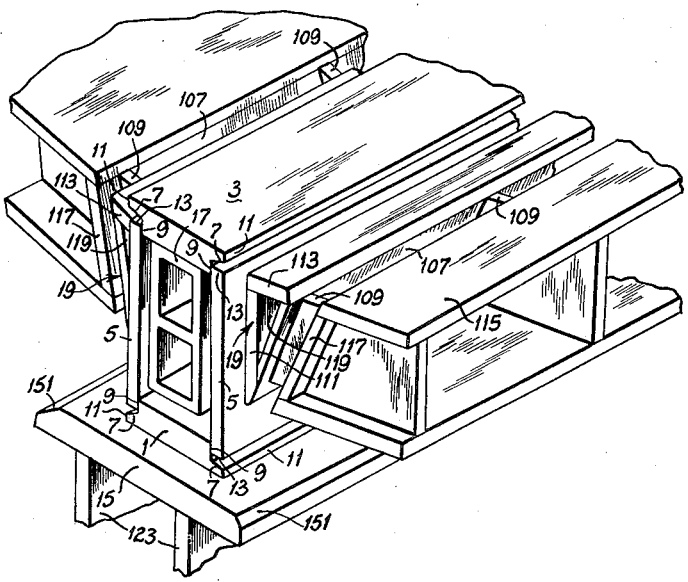
Fig. 1 is an oblique detail view illustrating certain features of the invention.
Figure 2:
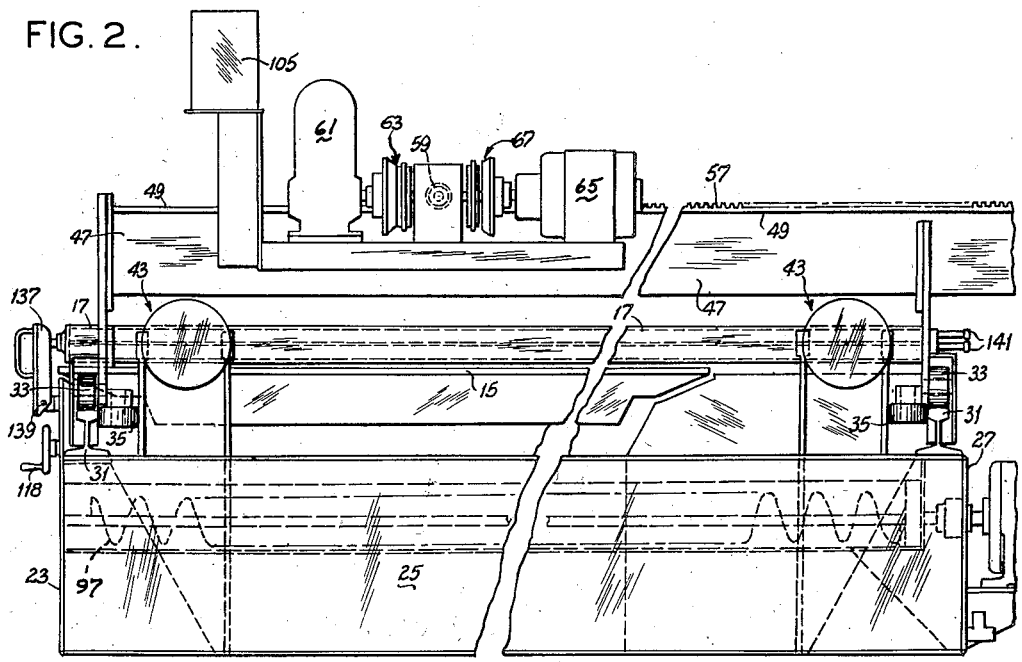
Fig. 2 is a side elevation of a welding machine embodying the invention.

Referring now to Fig. 1 of the drawings, there is shown a box beam which is formed by simultaneous welding of horizontal members 1 and 3 to vertically-supported members 5. The lower and upper members 1 and 3 are narrow plates, the edges of which have been in part cut away to form ledges 7 and shoulders 9, and the side-forming members 5 are simple plates of somewhat greater width but lesser thickness. In assembly, the side plates 5 are held against the shoulders 9 and lie substantially flush with the edges 11 of the top and bottom members. The edges 13 of the side plates 5 are spaced from the ledges 7, which may be sloped, thereby providing open V-butt joints, and the joints open at the sides of the work so that all welding is "horizontal" or in the three and nine o'clock positions.

The mechanism for holding the work comprises an elongate table 15, an overlying, generally coextensive horn 17 and side clamping jaws 19. The bottom member 1 of the work rests upon the elongate table 15, whereas the top piece 3 is supported upon the horn 17. In assembly, the side plates are initially elevated over the lower ledges 7 by means of wedge elements 21, and the jaws 19 are then brought together to clamp the sides 5 against the shoulders 9. Once the side plates have been clamped in position, the wedge elements 21 may be withdrawn clear of the lower joints (Fig. 7).

During the welding operation, water may be circulated through the horn 17 and the jaws 19 to prevent overheating of the work. All four welds are begun substantially simultaneously at one end of the work and the welds are built up along the joints at approximately the same rate. Accordingly, any transverse section of the work is uniformly heated at the four corners, and a distorting force developed at one corner of the work is counteracted by a similar distorting force developed in an opposite corner. Necessarily, the welding at all of the joints should be at about the same temperature, and the welds should be of the same general cross-sectional shape and size, so that the opposite edges of each plate are subjected to the same expansion and contraction forces. The composite effect is then one wherein the work does not bend or twist during or after the welding pass, and no interim or subsequent straightening is required.

The invention contemplates that the work holding elements will be mounted upon an automatic welding machine having four welding units which are mounted to move longitudinally of the beam at a controlled rate, thereby to fill the joints under controlled uniform conditions. The welding units may also be adapted for transverse movement with the jaws 19, so that they can be drawn clear of the work during initial set-up or upon completion of the welding pass.

Referring now to Figs. 2–5, there is shown a welding machine having an open base formed by a front 23, sides 25 and a back 27. The work-supporting table 15 and horn 17 are mounted over the base upon the front and back portions to extend parallel and centrally between the sides thereof. The jaws 19 extend on opposite sides of the horn 17, and each of these jaws is mounted upon a transversely movable frame 29.

Figure 5:
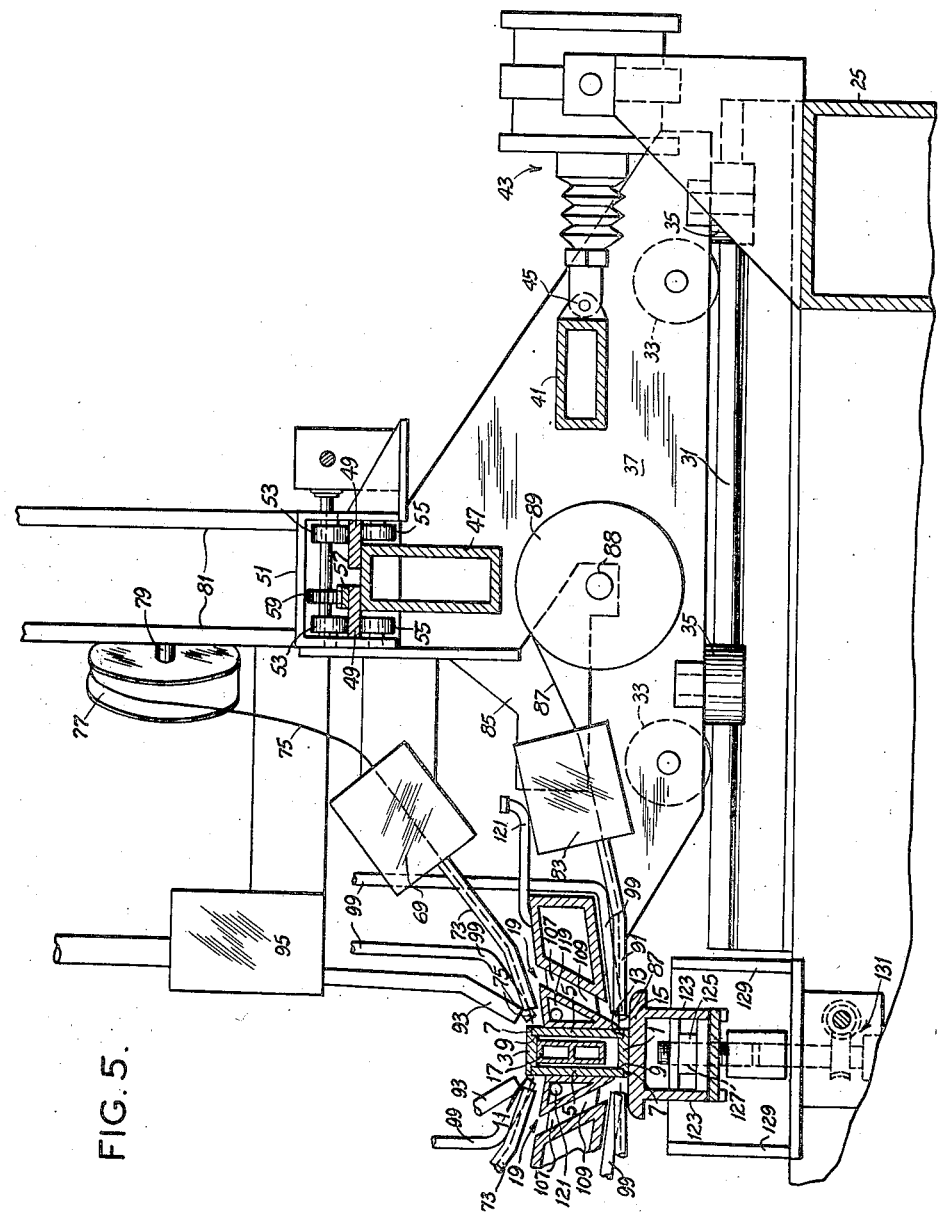
Fig. 5 is a transverse vertical section of the machine showing one of the transversely movable frames in its advanced position.

Transverse rails 31 are affixed to the base over the front and back members 23 and 27, and the frames are movably supported upon the rails by means of vertical rollers 33 and horizontal rollers 35. Each frame comprises end sections 37 within which the vertical rollers 33 are journaled, and the jaw 19 is fastened at 39 to extend between the inner portions of these end sections. The end sections 37 are additionally secured together by an outer longitudinal member 41, and the transversely movable frame is actuated by means of pneumatic power devices 43, the cylinder portions of which are mounted on the sides of the base and the pistons of which are connected at 45 to the longitudinal frame member 41. In Fig. 5, the movable frame is shown to be in its advanced work-clamping position, but the power devices 43 may be operated to retract the frame and disengage the jaw 19 from the side of the work. The amount of retraction need not be large and would normally be only that needed for convenience in setting up the work around the horn 17.

Movement of the frame 29 may also be adapted to clear the welding units from the work, and to that end, an upper frame element 47 is fastened to the end sections 37. Longitudinal rails 49 are mounted to overhang the frame element 47, and a carriage platform 51 is supported upon upper and lower rollers 53 and 55 for movement therealong. An elongate rack 57 is also fixed adjacent one of the rails 49, and a pinion 59 is journaled on the platform in mesh with the rack (see Figs. 4 and 5). During a welding pass, this pinion is driven by a variable speed drive 61 through an electrically actuated clutch 63. A high-speed drive unit 65 and clutch 67 may be provided to return the work upon completion of the welding operation.

The platform 51 also carries certain apparatus for feeding the electrode and flux to the work. An upper welding head 69 is supported from the inner side of the platform, and a guiding tube 73 extends therefrom to the upper joint of the work. Electrode material 75 is fed by the unit 69 through the tube 73, electrode material being coiled upon a drum 77, which is journaled at 79 upon a framework 81 extending from the top of the carriage platform.

A second electrode-feeding unit 83 is supported at 85 from the carriage in a position generally below and perhaps slightly behind the upper unit 69. An electrode 87 is drawn from a second supply drum 89 and is fed automatically by the unit 83 through a guiding tube 91 to the lower joint of the work. The drum 89 is journaled at 88 upon a portion of the support 85 that projects beneath the frame element 47.

Figure 3:
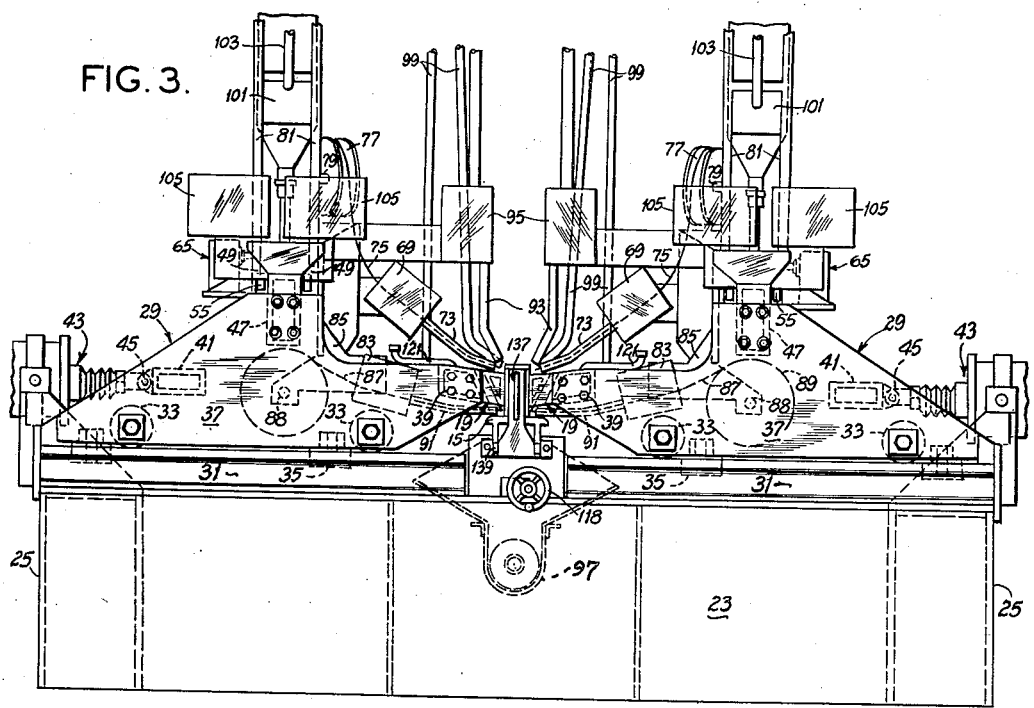
Fig. 3 is a front end view of the machine.
Figure 4:
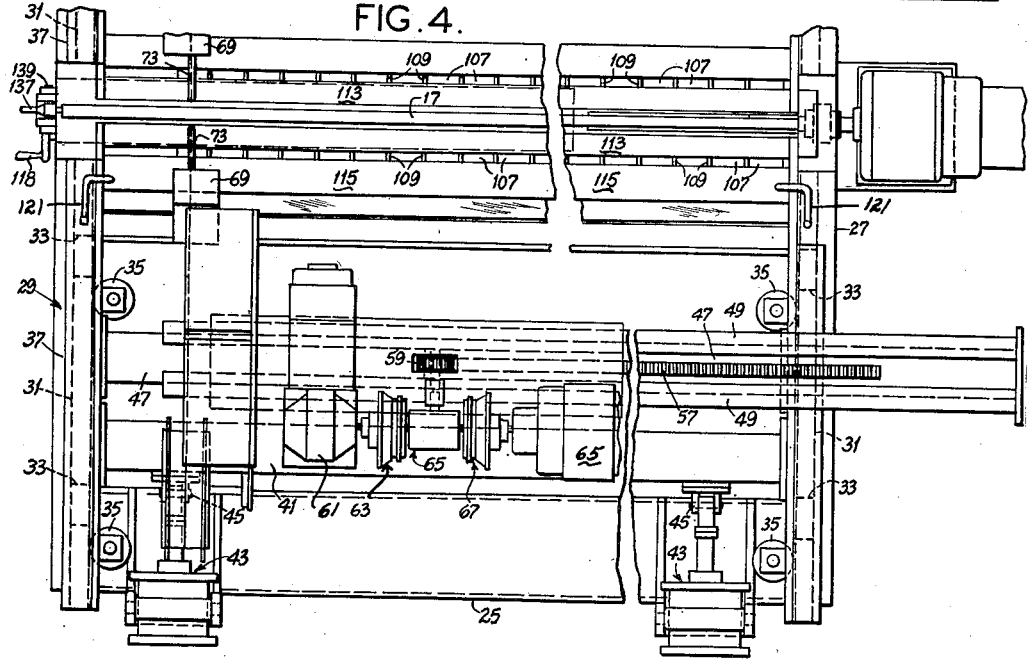
Fig. 4 is a top plan view of a portion of the machine shown in Figs. 2 and 3.

The invention contemplates utilization of the submerged arc process, whereby the joint is covered with a mound of granulated flux at the point where an arc is drawn by an electrode. Flux is gravity fed to the upper joints through nozzles 93, which are connected through remotely-actuated valve units 95 to supply hoppers (not shown). The valve units 95 are opened preparatory to drawing the arcs and are closed at the completion of a welding run. An auger conveyor 97 and suction nozzles 99 may also be provided adjacent the upper and lower joints for collecting and returning flux for reprocessing, the nozzles being operative when the carriages are returned to the rear of the machine after a welding pass. Blower units 101 are connected at 103 to the supply hoppers, the hoppers and blower units 101 being supported upon the upper framework 81 of the carriage. Electronic control units 105 may also be mounted upon the carriage, as indicated in Fig. 3 of the drawings.

The electrode guiding tubes 73 and 91 are mounted to extend above and below the jaw 19, and the upper portion of this jaw forms a trough upon which a mound of flux is built over the upper joint of the work. For this purpose, the upper surface of the jaw may be somewhat inclined from the side of the work.

A similar mound of flux is built up upon the table 15 over the lower joint, and flux is conveyed thereto through passages 107 in the jaw (Figs. 1 and 5). The jaw comprises a plurality of transverse partitions 109 upon which an inner clamping face 111 and a narrow top-forming member 113 are secured. A second top-forming member 115 is secured over the partitions 109 in outwardly spaced relationship from the member 113 to form inlets to the passages 107. The passages are angled back to the side of the work by a member 117, so that the outlets thereof are immediately adjacent the lower joint. Also, the inner portion 119 of the jaw is hollow (the partitions 109 being apertured), and water connections 121 are provided at the ends of the jaw for lengthwise circulation of cooling water adjacent the sides of the work.

Referring now to Figs. 5–7, the work-supporting table 15 includes a pair of depending ribs 123 which carry non-rotating nuts 125. The nuts 125 cooperate with screw jacks 127 rotatably supported on brackets 129. These brackets are fastened to the base at the front and back, and the screw jacks 127 engage with a longitudinal worm 131, which is rotated by a wheel 118 at the front of the machine. As such, the table may be raised or lowered to accommodate work of varying dimensions.

The horn 17 is a longitudinal hollow member having upper and lower water-cooling passages 133 and 135, and it is fixed at its rear end to the rear base member 27 and at its forward end to a releasable support 137, which is hinged at 139 upon the front 23 of the base. The support 137 is adapted to be disconnected from the horn and swung outwardly to permit outward withdrawal of the work upon completion of the welds. The water-cooling passages are connected together at the front end of the horn and have water input and output connections 141 at the rear end.

The wedge-like spacing elements 21 rest upon the outer margins of the table and are actuated inwardly by cranks 143. The cranks 143 are affixed to longitudinal rods 144, and the latter are journaled at the sides 123 of the table in bracket 145. Pneumatic power units 147 carried by the table rotate the rods 144 by cranks 149, so that elements 21 may be advanced inwardly over the table 15. The meeting edges of the wedging elements 21 and table 15 are beveled as indicated at 151, and when the wedging elements 21 are advanced, as indicated by the dotted lines, they project over the ledges 7 at the bottom of the work. The sides 5 of the work are initially supported upon these elements, and when the clamping jaws 19 are brought together, the side plates 5 are frictionally held against the shoulders 9. Thereafter, the pneumatic units 147 are actuated to retract the wedging elements clear of the lower joints. It will be noted that these elements extend only a short distance along the center portion of the work, and the welding apparatus would normally be located at the rear end of the machine during this initial set-up operation, so that the electrodes may enter the joints when the frames 29 are advanced to clamp the work. The wedge elements are withdrawn in order to permit the electrodes to travel along the joints during the welding pass.

In operation, the transversely movable frames are initially retracted while the bottom and top plates 1 and 3 of the work are inserted endwise to rest upon the table 15 and horn 17, respectively. The table is then adjusted in elevation by means of the hand wheel 118 to a position corresponding to the width of the side plates 5, and the spacing elements 21 are advanced inwardly. In their advanced positions, the elements 21 support the side plates 5 above the ledges 7 of the lower plate 1, thereby to form the lower joints. The spacing between the table 15 and the top of the horn 17 is otherwise sufficient to provide for a gap between the top edges 13 of the side plates 5 and the ledges 7 of the top plate 3. When the clamping jaws 19 are brought together, the side plates are clamped against the shoulders 9 so that the joints are held while the spacing elements 21 are drawn clear of the lower joints.

The carriages 51 and attached welding heads 69 and 83 are initially at the rear end of the machine, the ends of the four electrodes 73 and 87 being located closely adjacent the four joints of the work. Circulation of cooling water may begin through the horn 17 and jaws 19; and the flux controls are operated so that flux is fed through the elements 93 and 95 to a point ahead of the upper electrodes 75. A mound of flux is thus built up on each jaw 19 over each of the upper joints, and some of this flux necessarily overflows through the jaw passages 107 to the table 15, thereby to form similar mounds of flux over the lower joints.

The welding itself is preferably of the submerged arc type (see Patent No. 2,043,960), but all welds are commenced at substantially the same time at one end of the work. The four welding heads are advanced at approximately the same rate, the drive 61 functioning to move the carriages on each side of the machine at a uniform controlled rate. Although the carriages are shown to be separately driven, it will be understood the associated speed controls are adjusted so that they progress along the work with the several electrodes in substantial transverse alignment, the joints thereby being progressively filled in apposition.

Generally, only one welding pass is required, so that when the carriages reach the other end of the machine, the arcs are broken and the carriages are returned. Loose flux is picked up from the table 15 and jaws 19 by the suction nozzles 99 on the return trip, and that portion of the flux which falls from the table is returned by the auger conveyor 97 for reprocessing and reuse. Finally, the jaws 19 are moved apart and the forward support 137 for the horn 17 is swung open, so that the work can be withdrawn from the front of the machine. With this process, the finished box beam is substantially free of distortion, hence no difficulties are encountered in its removal.

In order to preclude distortion, however, it is important that the joints be filled progressively in apposition under welding conditions (such as temperature and weld cross section) which are as nearly identical as possible. In this respect, the term "in apposition" is used to indicate approximate transverse alignment of the several welding heads at all times during the welding operation. Although different welding techniques may otherwise be employed, it has been found that direct current welding is preferred, although no significant differences are detected when the horizontally opposed heads are series connected as against a condition where all heads are connected in parallel, a common return being made through the clamping jaws 19.

From the foregoing description, it is apparent that those skilled in the art will understand the structure, function and mode of operation of the invention herein disclosed, and appreciate the advantages thereof. Although one embodiment has been disclosed in detail, it is to be understood that the invention is not limited thereto, but the drawings and description thereof are to be understood as being merely illustrative. For example, the invention might be adapted to other elongate hollow structures of closed symmetrical cross section, provided the structure is made up with at least two longitudinal seams which are diametrically or otherwise symmetrically opposed to one another with respect to the axis of the structure. It is realized that many modifications and variations will present themselves to those skilled in the art without departing from the spirit of this invention or the scope thereof as set forth in the appended claims.

Having thus described the invention, what is claimed and desired to be secured by Letters Patent is:

1. The process of welding comprising the steps of forming a pair of plates with stepped edges to provide recessed shoulders supporting said plates in spaced horizontal relation, clamping a second pair of plates against the recessed shoulders of said first pair of plates, the side plates being held with the edges in spaced relationship from the top and bottom plates to provide upper and lower joints along each side, and welding said joints substantially simultaneously.

2. An automatic welding machine comprising an elongate base, a work-supporting table extending longitudinally of said base between the sides thereof, an elongate work-clamping jaw supported above said table for horizontal transverse movement, and a pair of welding heads mounted for travel lengthwise of said jaw, one of said welding heads having electrode-feeding means disposed above said jaw and said other welding head having electrode-feeding means disposed below said jaw.

3. Apparatus as set forth in claim 2, further including means for feeding flux onto the upper portion of said jaw.

4. Apparatus as set forth in claim 3, wherein said jaw is formed with an inner clamping face and outer passages for overflow of flux to the work-supporting table.

5. An automatic welding machine as set forth in claim 2, further including a second elongate work-clamping jaw mounted opposite said first clamping jaw, and a second pair of welding heads supported for movement along said second jaw, one of said second pair of welding heads having electrode-feeding means disposed above said second jaw and the other having electrode-feeding means disposed below said second jaw.

6. An automatic welding machine as set forth in claim 2, further including a spacing element mounted for transverse movement over said work-supporting table, thereby to support a portion of the work in elevated relationship with said table when said jaw is retracted, said spacing element being retractable clear of the work when said clamping jaw is advanced into a work-clamping position.

7. The process comprising the steps of supporting a pair of narrow plates in horizontally-disposed vertically-spaced relationship to one another, supporting a second pair of narrow plates in vertically-disposed horizontally-spaced relationship between said horizontal plates, the edges of the vertical plates being spaced from the margins of the horizontal plates to provide horizontally-opening gaps extending along the four corners of the hollow rectangular structure thereby defined and welding within said gap with the welds at all four corners being made progressively from end to end of the structure in apposition to one another.

8. The process set forth in claim 7, wherein the horizontal plates rest upon supporting members and the vertical plates are clamped along their lengths against intervening supporting means.

References Cited in the file of this patent

UNITED STATES PATENTS

| | | |
|---|---|---|
| 1,323,556 | Smith | Dec. 2, 1919 |
| 1,732,900 | Kuhl | Oct. 22, 1929 |
| 1,831,343 | Caldwell | Nov. 10, 1931 |
| 2,198,264 | Caputo | Apr. 23, 1940 |
| 2,229,570 | Howard | Jan. 21, 1941 |
| 2,357,170 | Burggraf | Aug. 29, 1944 |
| 2,400,889 | Ridder | May 28, 1946 |
| 2,401,722 | Clapp | June 11, 1946 |
| 2,466,497 | Smith | Apr. 4, 1949 |
| 2,665,363 | Wepfer | Jan. 5, 1954 |
| 2,691,952 | Wilson et al. | Oct. 19, 1954 |

FOREIGN PATENTS

| | | |
|---|---|---|
| 274,369 | Great Britain | July 21, 1927 |